(12) United States Patent
Jain et al.

(10) Patent No.: US 11,729,438 B1
(45) Date of Patent: Aug. 15, 2023

(54) OPTIMIZING STREAMING VIDEO ENCODING PROFILES

(71) Applicant: Amazon Technologies, Inc., Seattle, WA (US)

(72) Inventors: Vishal Jain, Rohtak (IN); Deepthi Nandakumar, Bengaluru (IN); Sriram Sethuraman, Bangalore (IN); Sandesh Ghanta, Visakhapatnam (IN)

(73) Assignee: Amazon Technologies, Inc., Seattle, WA (US)

(*) Notice: Subject to any disclaimer, the term of this patent is extended or adjusted under 35 U.S.C. 154(b) by 74 days.

(21) Appl. No.: 17/248,544

(22) Filed: Jan. 28, 2021

(51) Int. Cl.
| | |
|---|---|
| H04N 21/2343 | (2011.01) |
| H04N 21/25 | (2011.01) |
| H04N 21/845 | (2011.01) |
| H04N 21/442 | (2011.01) |
| H04N 21/44 | (2011.01) |
| H04N 21/24 | (2011.01) |
| H04N 21/4425 | (2011.01) |
| H04N 21/266 | (2011.01) |

(52) U.S. Cl.
CPC ..... *H04N 21/2343* (2013.01); *H04N 21/2402* (2013.01); *H04N 21/251* (2013.01); *H04N 21/26616* (2013.01); *H04N 21/442* (2013.01); *H04N 21/44008* (2013.01); *H04N 21/4424* (2013.01); *H04N 21/4425* (2013.01); *H04N 21/44209* (2013.01); *H04N 21/8456* (2013.01)

(58) Field of Classification Search
CPC .......... H04N 21/26616; H04N 21/442; H04N 21/44209; H04N 21/24; H04N 21/2402; H04N 21/4425; H04N 21/4424; H04N 21/44008; H04N 21/2343; H04N 21/251; H04N 21/8456
See application file for complete search history.

(56) References Cited

U.S. PATENT DOCUMENTS

| | | | |
|---|---|---|---|
| 9,179,159 B2* | 11/2015 | Good | H04N 21/2662 |
| 10,419,773 B1 | 9/2019 | Wei et al. | |
| 10,666,992 B2* | 5/2020 | Katsavounidis | H04N 19/147 |
| 10,721,475 B2 | 7/2020 | Sethuraman et al. | |
| 11,019,374 B2* | 5/2021 | Wallendael | H04N 21/234381 |
| 11,025,914 B1* | 6/2021 | Yuen | H04N 19/149 |
| 11,184,638 B1 | 11/2021 | Sipitca | |
| 11,277,620 B1* | 3/2022 | Liu | H04N 21/23418 |
| 11,343,492 B2* | 5/2022 | Chadwick | H04N 19/139 |
| 11,503,302 B2* | 11/2022 | Pandit | H04N 19/105 |
| 2009/0310673 A1* | 12/2009 | Chung | H04N 19/14 375/240.03 |
| 2012/0206476 A1* | 8/2012 | Woolfe | H04N 1/60 345/589 |
| 2015/0036740 A1* | 2/2015 | Yang | H04N 19/1887 375/240.02 |

(Continued)

OTHER PUBLICATIONS

Datanovia: "Cluster Validation Statistics: Must Know Methods" https://www.datanovia.com/en/lessons/cluster-validation-statistics-must-know-methods/ [retrieved on Jan. 28, 2021].

(Continued)

*Primary Examiner* — Nasser M Goodarzi
*Assistant Examiner* — Patrick A Ryan
(74) *Attorney, Agent, or Firm* — Weaver Austin Villeneuve & Sampson LLP

(57) ABSTRACT

Techniques are described for optimizing streaming video encoding profiles.

20 Claims, 4 Drawing Sheets

(56) References Cited

U.S. PATENT DOCUMENTS

| | | | | |
|---|---|---|---|---|
| 2016/0007050 | A1* | 1/2016 | Rusert | H04N 19/167 |
| | | | | 375/240.25 |
| 2016/0037176 | A1* | 2/2016 | Chari | H04N 21/23439 |
| | | | | 375/240.26 |
| 2016/0295216 | A1* | 10/2016 | Aaron | H04N 21/23439 |
| 2017/0085929 | A1* | 3/2017 | Arpteg | G06N 20/00 |
| 2018/0242015 | A1* | 8/2018 | Katsavounidis | |
| | | | | G11B 20/00007 |
| 2018/0343458 | A1 | 11/2018 | Katsavounidis et al. | |
| 2019/0028745 | A1* | 1/2019 | Katsavounidis | H04N 19/59 |
| 2019/0289296 | A1* | 9/2019 | Kottke | H04N 19/179 |
| 2021/0144377 | A1* | 5/2021 | Lei | H04N 19/124 |
| 2021/0160512 | A1 | 5/2021 | Liu et al. | |
| 2021/0297739 | A1* | 9/2021 | Manus | G06N 5/025 |

OTHER PUBLICATIONS

Wikipedia: "Dunn index" https://en.wikipedia.org/wiki/Dunn_index [retrieved on Jan. 28, 2021].

Wikipedia: "k-means++" https://en.wikipedia.org/wiki/K-means%2B%2B [retrieved on Jan. 28, 2021].

Wikipedia: "k-medoids" https://en.wikipedia.org/wiki/K-medoids [retrieved on Jan. 28, 2021].

Wikipedia: "Lloyd's algorithm: Different distances" https://en.wikipedia.org/wiki/Lloyd%27s_algorithm#Different_distances [retrieved on Jan. 28, 2021].

Datanovia: "Cluster Validation Statistics: Must Know Methods" https://www.datanovia.com/en/lessons/cluster-validation-statistics-must-know-methods/ [retrieved on Sep. 28, 2021].

Wikipedia: "Dunn index" https://en.wikipedia.org/wiki/Dunn_index [retrieved on Sep. 28, 2021].

Wikipedia: "k-means++" https://en.wikipedia.org/wild/K-means%2B%2B [retrieved on Sep. 28, 2021].

Wikipedia: "k-medoids" https://en.wi.kipedia.org/wiki/K-medoids [retrieved on Sep. 28, 2021].

Wikipedia: "Lloyd's algorithm: Different distances" https://en.wikipedia.org/wiki/Lloyd%27s_algorithm#Different_distances [retrieved on Sep. 28, 2021].

U.S. Appl. No. 17/449,183, filed Sep. 28, 2021, Nandakumar et al.

U.S. Restriction Requirement dated Aug. 29, 2022 in U.S. Appl. No. 17/449,183.

U.S. Non-Final Office Action dated Oct. 24, 2022, in U.S. Appl. No. 17/449,183.

\* cited by examiner

OPTIMIZING STREAMING VIDEO ENCODING PROFILES

BACKGROUND

Streaming video services encode source content into various resolution and bit rate levels. These various resolution and bit rate levels allow the streaming video service to tailor video streams to a customer's playback device capability and bandwidth availability. On the client side, software running on the playback device adaptively switches between resolution and bit rate levels according to algorithms that manage the video quality and playback experience.

For a streaming video service with a large media content catalog having diverse content characteristics, determining the specific set of available resolution and bit rate levels for optimizing the customer experience remains a challenge. Furthermore, for a given resolution and bit rate level, automated and efficient determination of the values for encoding parameters is also a challenge. This challenge is increased in the context of codecs with numerous encoding parameters (e.g., 30-50), such as, for example, the Advanced Video Coding (AVC), High-Efficiency Video Coding (HEVC), and AOMedia Video 1 (AV1) codecs. Specifically, such codecs utilize encoding profiles having numerous encoding parameters, such as quantization parameters, block size parameters, adaptive encoding optimization parameters, and so forth, with each encoding parameter having either direct or indirect impact on encoding bit rate and quality. To address these challenges, streaming video services have conventionally relied on human subject matter experts to perform trial and error analysis on a limited dataset to determine a set of encoding profiles. While streaming video services have replaced certain manual processes by using computational modules for search/optimization processes, they have typically been limited to one or two encoding parameters, such as, for example, a quantization parameter or constant rate factor.

DETAILED DESCRIPTION

This disclosure describes techniques for tailoring sets of streaming video encoding profiles to the characteristics of a collection of video content. Optimization of multiple sets of streaming video encoding profiles (referred to herein as an encoding ladders) to accommodate variegated content and diverse playback conditions, such as, for example, by providing different tiers of bit rates and resolutions, includes adaptive sampling of video content, prioritization of encoding parameters, rate-quality data sampling of an encoding parameter combination space, data space pruning, and optimizing cost functions based on system constraints The techniques disclosed herein can be applied to an entire catalog of videos, a subset/group of video files, a single video title, or to video segments within a single video title. The techniques are codec-agnostic and can be applied to a scalable number of encoding parameters, rather than being limited to one or two encoding parameters. An example will be instructive.

Figure 1:
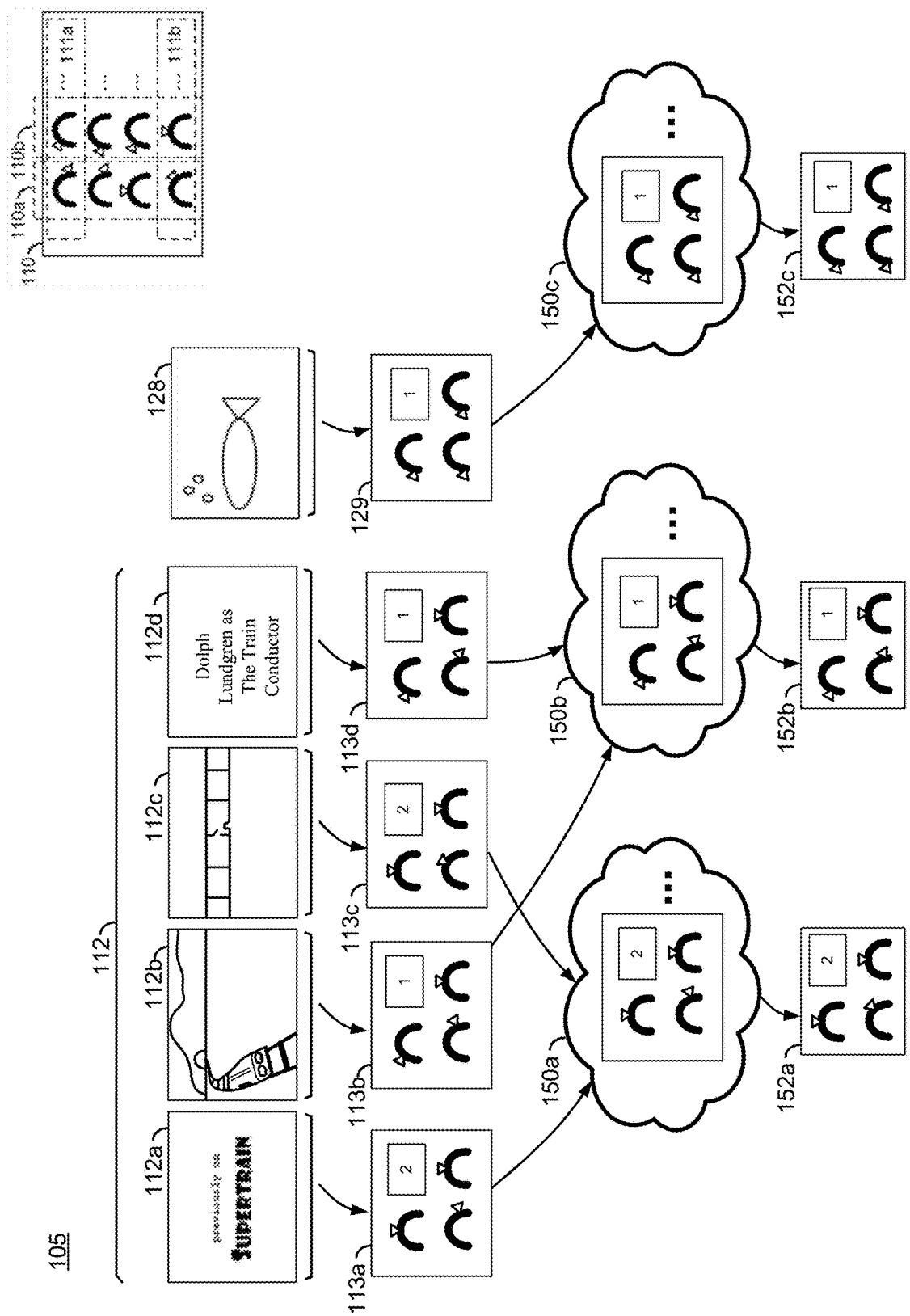
FIG. 1 illustrates an example of optimizing encoding profiles.

FIG. 1 illustrates an example of encoding content with optimized encoding ladders (i.e., sets of encoding profiles tailored to the characteristics of the media content being encoded). In FIG. 1, media content 105 includes video presentation 112, which includes clips 112a-112d, and includes clip 128, with at least two of the clips having different characteristics. As examples, video presentation 110 may be a live-action movie including a recap clip 112a, an action clip 112b, a close-up clip 112c, and an end credits clip 112d; and clip 128 may be a clip from an animated video.

FIG. 1 depicts default encoding ladder 110 with four "rungs," each rung corresponding to a particular encoding profile (i.e., a particular set of encoding parameter values for, among other things, various resolutions and bitrates). Encoding ladders allow delivery of a range of viewing experiences to users connecting with different devices over varying bandwidths, with "higher rungs" generally corresponding to higher bandwidth consumption, higher resolutions, and/or higher visual qualities. A particular encoding ladder is configured to make tradeoffs between resources consumed during the encoding/decoding process (e.g., processing time, bandwidth, storage, etc.) and visual quality.

In FIG. 1, each encoding profile in encoding ladder 110 (e.g., profiles 111a and 111b) includes an encoding parameter 110a. Encoding parameter 110a corresponds to image resolution, and can take on the four values of UHD, 1080p, 720p, and 576, with each encoding profile in default encoding ladder 110 corresponding to a different image resolution value. FIG. 1 also depicts that each encoding profile in ladder 110 has an encoding parameter 110b. Encoding parameter 110b corresponds to a quantization parameter, which represents a factor applied to residual coefficients that indicate differences in image content between different portions, or coding units, of an image frame to scale down the residual coefficients as a compression technique. Encoding parameter 110b can have a range of values, such as, for example, from 0-51. In FIG. 1, encoding profile 111a (corresponding to the UHD resolution) has a low quantization parameter value that results in less compression and higher quality, and encoding profile 111b (corresponding to the 576i resolution) has a high quantization parameter value that results in more compression and lower quality.

In some scenarios, default encoding ladder 110 corresponds to an encoding ladder that is applied to media content 105 irrespective of the characteristics of media content 105 (e.g., what kind of event the media is and the typical encoding complexity of that kind of event). That is, default encoding ladder 110 is applied to video clips 112a-d, 128, and other video presentations in media content 105, resulting in each of the video presentations in media content 105 being encoded as multiple representations corresponding to each of the encoding profiles in default encoding ladder 110.

However, a default encoding ladder may not be well-suited for all content. For example, a particular value for an encoding parameter setting such as the quantization parameter may provide a high-quality encoding of content of a first category (e.g., concerts having relatively little motion). However, content of a second category (e.g., sports events having a relatively higher degree of motion) might not be encoded as well since the parameter settings for high quality encodings vary based on the characteristics of the content, including, but not limited to, levels of motion, spatial details, and encoding complexity. As another example, the default encoding ladder may be well-suited for providing a high-quality encoding of live-action content, but animated content might not be encoded as well since the encoder parameter settings for animated content may vary from live-action content. Therefore, if the default encoding ladder is tailored to a first category or type of content, other categories or types of content may be encoded with sub-optimal quality and/or result in excessive bitrates.

In FIG. 1, rather than using default encoding ladder 110, a plurality of optimized encoding ladders can be determined based on trial encodings of media content 105. FIG. 1 illustrates an individual rung of the optimized encoding ladder of for each trial-encoded clips. In particular, FIG. 1 illustrates rung 113a of an optimized encoding ladder for clip 112a, rung 113b of an optimized encoding ladder for clip 112b, rung 113c of an optimized encoding ladder for clip 112c, rung 113d of an optimized encoding ladder for clip 112d, and rung 129 of an optimized encoding ladder for clip 128. In the example of FIG. 1, the rungs illustrate encoding parameters that can be adjusted in continuous or discrete steps, as well as an encoding parameter that's configurable between a limited number of discrete settings. As an example of such a parameter, an AQ-mode parameter may have a setting of 1, 2, or 3.

Examples of how to determine an optimized encoding ladder for a given clip are described by Hai Wei et al., U.S. patent application Ser. No. 15/981,517, which is hereby incorporated by reference in its entirety and for all purposes.

It may be desirable to cluster together "similar" encoding ladders from the plurality of clip-level-optimized encoding ladders, as shown in clusters 150a-150c of FIG. 1. By clustering together "similar" encoding ladders, the number of distinct encoding ladders can be reduced. Each clip may also be assigned to a cluster based on a similarity measurement relative to the centroids of the available clusters. A clip that is assigned to a particular cluster may be encoded with that cluster's centroid (e.g., the encoding ladder optimized for that cluster). Cluster 150a may have an associated cluster-optimized encoding ladder including rung 152a, cluster 150b may have an associated cluster-optimized encoding ladder including rung 152b, and cluster 150c may have an associated cluster-optimized encoding ladder including rung 152c.

A clip that is encoded with its cluster's centroid will be sub-optimally encoded relative to the theoretically best possible encoding of that clip. In particular, the curve of highest possible image quality as a function of bitrate (hereinafter RQ-curve) will be lower when a clip is encoded with its cluster's centroid as opposed to an encoding ladder optimizing specifically for that clip. It would therefore be desirable to reduce or minimize the differences in RQ-curves, by appropriately selecting clusters centroids and assigning clips to clusters in a manner that reduces the total differences in RQ-curves. In other words, it may be desirable for the centroid in a particular cluster to be the encoding ladder where the total "distance" or "dissimilarity" between the RQ-curves using that encoding ladder and the RQ-curves for clip-optimized encoding ladders. In this context, "distance" or "dissimilarity" may be defined using equation (1).

$$D(c,p) = (A(c,p^c) - A(c,p))/A(c,p^c) \qquad (1)$$

Figure 4:
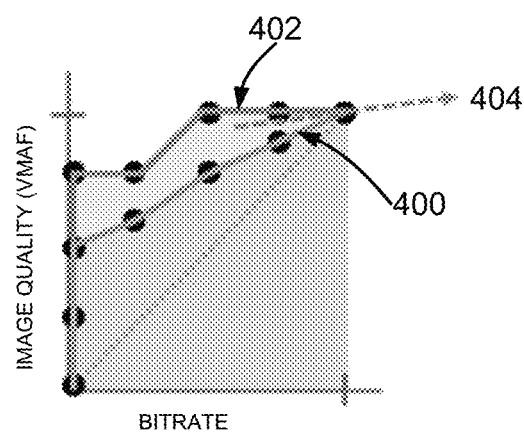
FIG. 4 is a graph of a image quality versus bitrate.

In equation (1), $p^c$ may refer to the optimal parameter-hull (e.g., optimal encoding ladder) for the shot c, $A(c, p)$ may refer to the area under the piece-wise RQ curve when clip c is encoded with parameter-hull p. An example is shown in FIG. 4, where curve 402 is the RQ curve generated by the optimal parameter set for clip c and curve 400 is the RQ curve generated by a candidate parameter set for a cluster's centroid. The difference in areas under curve 400 and 402 (e.g., area 404) can be used as a measure of how sub-optimal the candidate parameter set for the cluster's centroid is relative to the optimal parameters for the particular clip c.

As part of clustering together "similar" encoding ladders, a set of initial clusters may be initialized. Any desired strategy for initializing clusters may be utilized. As an example, when it is desired to form k clusters, k encoding ladders may be randomly or pseudo-randomly selected as k centroids of respective k clusters. As another examples, a k-means++ algorithm may be used for selecting the initial clusters.

After initializing clusters, the remaining encoding ladders may be then assigned to their "nearest" cluster (e.g., according to equation (1) or some similar measure of distance or similarity). After initialization, it may be desirable to change which encoding ladder within each cluster is designated as the centroid. In particular, it may be desirable to select, as centroid encoding ladder for each cluster, whichever encoding ladder minimizes the sum of "distances" for all encoding ladders within that cluster, according to equation (1) or some similar measure of distance of similarity. In particular, it may be desirable for the centroid encoding ladder to result in the lowest sum of distances, where the sum includes the distance between the candidate centroid encoding ladder and the clip-optimal encoding ladder, across some or all of the clips in the cluster.

In some cases, altering the centroid encoding ladder can change the assignments of encoding ladders to certain clusters. As an example, a given shot may be initially "closer" to the centroid of cluster A, but after updating the centroids of cluster A and/or cluster B, the same shot may be "closer" to the centroid of cluster B. Thus, it may be desirable to re-assign shots to clusters after selecting one or more new centroid encoding ladders for one or more respective clusters. The process of assignment and centroid updating may be repeated as long as desired. As an example, the process of assignment and centroid updating may be performed until a predetermined maximum number of iterations is reached.

In some implementations, the quality of clustering may be evaluated, e.g., to determine if any clusters need to be merged and/or split. As an example, a "Dunn index" may be calculated which reflects separability inside clusters and between clusters (e.g., evaluating the compactness and separation of the clusters). The "Dunn index" may be a ratio of the minimum of inter-cluster distances and maximum of intra-cluster distances. When the "Dunn index" is relatively small, it may be a sign that one or more clusters is too large and should be split. Conversely, when the "Dunn index" is relatively large, it may be a sign that one or more clusters should be merged.

One benefit of this approach is that the centroid is always a real parameter set from a video within the cluster. In contrast, other techniques for clustering encoding ladders may take the mean and/or median of encoding parameters within the cluster, and thus represent a theoretical parameter set, which in some cases may not even be practically usable. Nonetheless, other techniques for clustering encoding ladders, including those using means and/or medians, may be used.

In some implementations, the number of clusters may vary with desired quality level and bitrate, as fewer clusters may be needed at relatively low quality levels and bitrates. As a particular example, certain differences between shots such as the presence of film-grain may disappear at relatively low quality levels (where such film-grain would generally not be preserved). Thus, while it may be beneficial to have a separate clusters specialized for film-grain shots and non-film-grain shots at high quality levels, it may be preferable to have a single cluster for both film-grain and non-film grain shots at lower quality levels.

The centroid encoding ladders, such as the ladders including rungs 152a, 152b, and 152c, may then be used to encode media content 105, where each shot is assigned to and encoded by a particular cluster and centroid encoding ladder.

Figure 2:
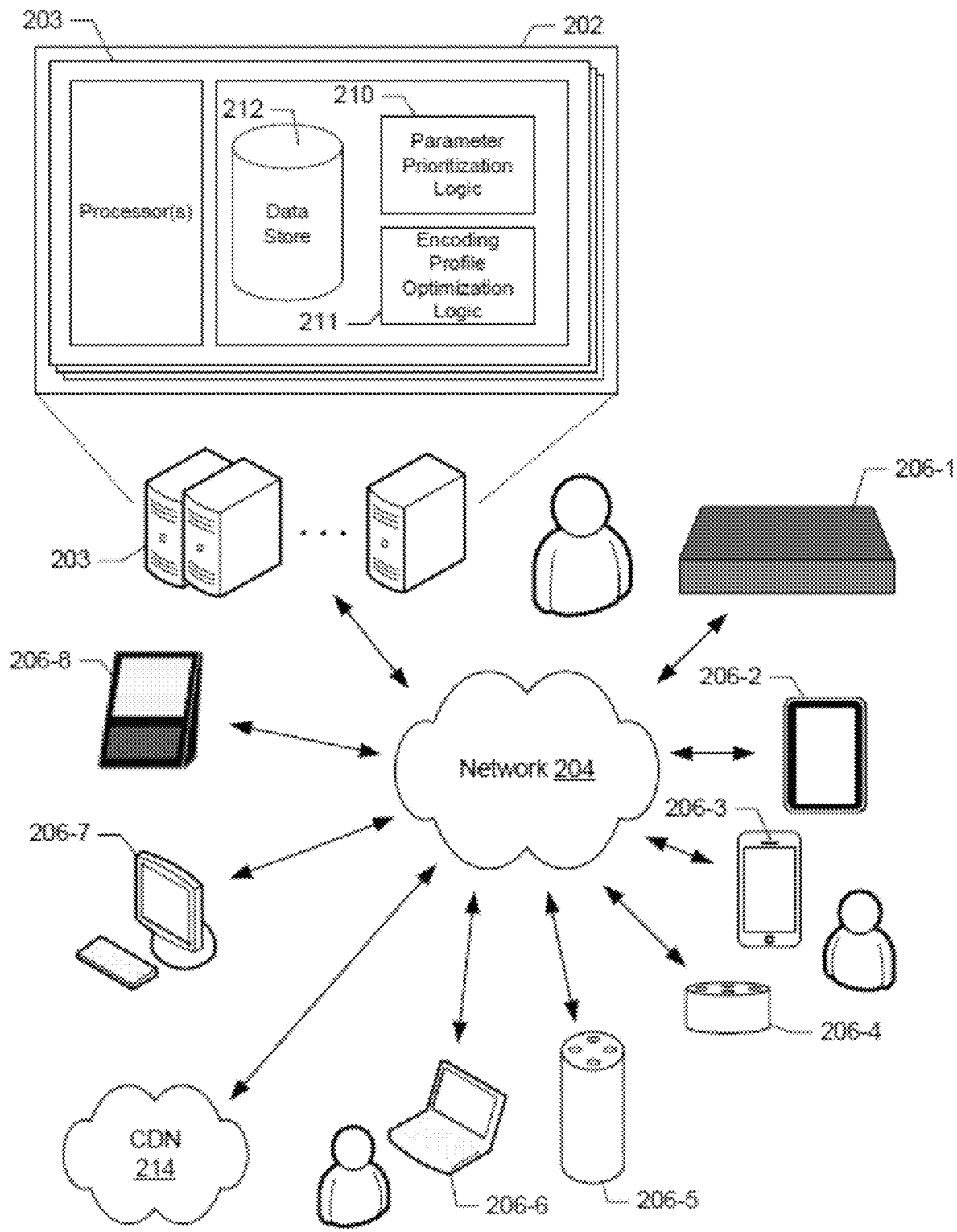
FIG. 2 illustrates an example of a computing environment for optimizing encoding profiles.

FIG. 2 illustrates an example of a computing environment in which encoding profiles may be optimized via clustering, as discussed in FIG. 1, and shots may be encoded with cluster-optimized encoding ladders in accordance with the techniques described herein. Service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and generating and/or consuming content streams. Such devices may include, for example, mobile devices (e.g., cell phones, smart phones, tablets, and the like), personal computers (e.g., laptops and desktops), set top boxes (e.g., for cable, satellite, and online systems), smart televisions, gaming consoles, wearable computing devices (e.g., smart watches or smart glasses), internet-connected cameras, voice-activated smart home devices (e.g., with integrated personal digital assistants), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling service 202. Alternatively, such resources may be independent of service 202, e.g., on a platform under control of a separate provider of services and/or computing resources with which service 202 connects to consume resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

It should also be noted that implementations are contemplated in which, in addition to encoding parameter prioritization logic 210 and encoding profile optimization logic 211, service 202 may include other types of logic (not shown) involved in the delivery of content as part of a video-on-demand service or a live/broadcast video service.

In addition to encoding video content according to cluster-optimized encoding ladders and providing access to video streams, service 202 may also include a variety of information related to the video content (e.g., other associated metadata and manifests in data store 212 which service 202 uses, or to which service 202 provides access). Data store 212 may also include data representing cost functions, constraints, historical information, machine learning models and encoding profiles implemented and generated as described herein. Alternatively, any of this information may be provided and/or hosted by one or more separate platforms, e.g., content delivery network (CDN) 214 or other third-party platform. It should be noted that, while logic 210 and 211, and data store 212 are shown as integrated with service 202, implementations are contemplated in which some or all of these operate remotely from the associated service, and/or are under the control of an independent entity. Those of skill in the art will understand the diversity of use cases to which the techniques described herein are applicable.

Figure 3:
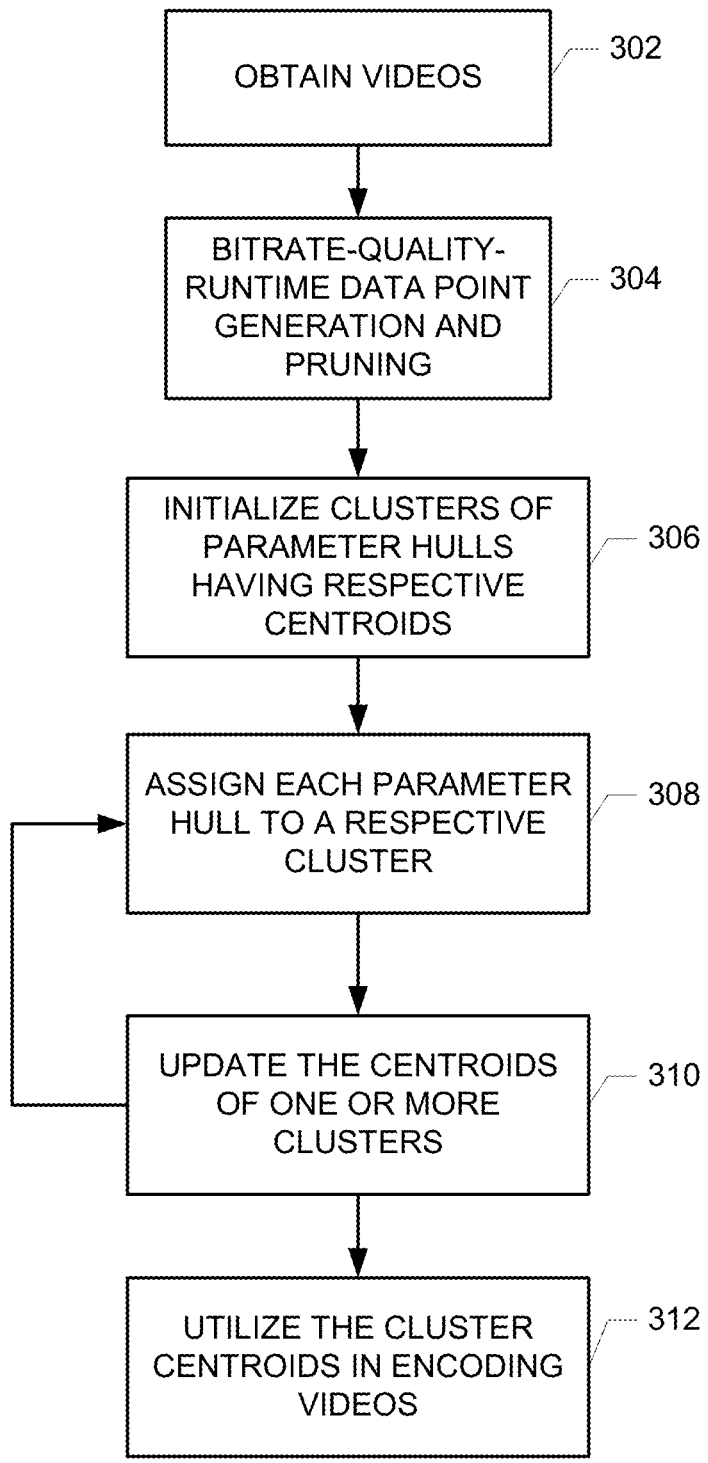
FIG. 3 is a flowchart illustrating processes for optimizing encoding profiles.

FIG. 3 illustrates a flowchart for generating cluster-optimized encoding ladders.

In a class of implementations, generating cluster-optimized encoding ladders includes obtaining videos (302), for performing trial encodes to generate points for a data space. Referring to FIG. 1, media content 105 contains multiple video presentations and multiple shots. For clarity purposes, FIG. 1 depicts five (5) shots or clips, though it should be appreciated that media content 105 contains more than the five (5) depicted shots.

In a class of implementations, generating cluster-optimized encoding ladders includes data point generation and pruning (304) for a multidimensional data space. Examples of dimensions of the data space include any combination of bit rate, quality, encoding runtime, network bandwidth, playback device limitations, end-user distribution and geographic constraints, etc. It should be appreciated that the dimensions of the data space may correspond to system constraints for the design of a video streaming service. In some implementations, data point generation and pruning (304) includes identifying shot-optimizing encoding ladders.

For example, the quality level for video played back to a customer of a video streaming service is a design constraint, therefore data point generation (304) uses a data space including a video quality level dimension. In certain implementations, the quality level corresponds to a quality metric algorithm that compares the compressed video with a reference source and outputs a value that predicts how viewers would rate the quality of the compressed video. A person having ordinary skill in the art would recognize that the disclosed techniques are compatible with a wide range of quality metric algorithms, including the Peak Signal-to-noise Ratio (PSNR), Structural Similarity Index (SSIM), Video Multimethod Assessment Fusion (VMAF), etc.

In certain implementations, the data space may also include a dimension for bit rate, such as kilobits per second (kbps). Such a dimension is indicative of the network bandwidth required for transmission of a segment of media content from a content delivery network edge server to a viewer device, and is also indicative of the viewer device content buffer requirements during playback of the downloaded segment of media content at the viewer device.

It should be appreciated that the data space may include dimensions that do not correspond to content playback characteristics. For example, one dimension in data space 175 may be encoding runtime, such as the amount of time to encode each frame in a particular video title. Such an attribute relates to the encoding process, rather than relating to decoding or playback at a viewer device.

Pruning of the data space may be performed based on one or more constraints. As previously described, examples of dimensions of the data space include any combination of bit rate, quality, encoding runtime, etc. Pruning of the points can be applied to particular dimensions of the data space. For example, pruning can be applied to ensure a minimum quality level by filtering out data points with a quality level below a threshold.

In a class of implementations, generating cluster-optimized encoding ladders includes initializing a plurality of clusters of parameter hulls having respective centroids (306). As previously described, initializing a plurality of clusters may involve randomly or pseudo-randomly selecting a plurality of shot-optimized encoding ladders as initial centroids. As another example, a k-means++ algorithm may be used for selecting the initial centroids from amongst the shot-optimized encoding ladders (generated in 304).

In a class of implementations, generating cluster-optimized encoding ladders includes assigning each parameter hull (e.g., each shot) to a respective cluster (308). As previously described, each parameter hull (e.g., each shot) can be assigned to whichever cluster has a centroid that is "closest" to that parameter hull. As a particular example, equation 1 can be used to determine the "distances" between a given parameter hull and each respective cluster's centroid parameter hull and the given parameter hull can then be assigned to whichever cluster's centroid parameter hull is "closest."

In a class of implementations, generating cluster-optimized encoding ladders includes updating the centroids of one or more clusters (310). As previously discussed, it may be desirable for each cluster's centroid to be the parameter hull that minimizes the total distance relative to the other parameter hulls with that cluster. The optimal centroid for a given cluster under this measure may also change as parameter hulls are assigned to or removed from the cluster. Additionally, as the centroid(s) of one or more clusters are updated, one or more parameter hulls may need to be switched from assignment within a first cluster to assignment within a second cluster. Thus, it may be desirable to iterate blocks 308 and 310 (as illustrated in FIG. 3). until desired. As an example, it may be desirable to iterate blocks 308 and 310 until a predetermined number of iterations has been performed.

In a class of implementations, the cluster centroids may be utilized in encoding videos for distribution (312). As an example, shots within media content 105 may be assigned to a cluster based on the distances between their optimal parameter hull and the various cluster centroids and then encoded with the centroid (e.g., cluster-optimized encoding ladder) for their assigned cluster.

It should be appreciated that video samples as referred to herein may be entire video presentations (e.g., an entire movie or sportscast), groups of video presentations, or may be shorter segments within a presentation, e.g., 2-60 second segments including one or more 2-10 second fragments or "groups of pictures" (GOPs). Additionally, it should be appreciated that the video samples as referred to herein may be in a variety of formats and resolutions and may include standard dynamic range (SDR) and high dynamic range (HDR) video content.

It should be noted that the techniques described herein are agnostic to specific codec implementation, and may be employed to configure encoders implemented according to any of a wide variety of video compression standards including, for example, Advanced Video Coding (AVC) or H.264, High Efficiency Video Coding (HEVC) or H.265, AV1, VP8, and VP9, as well as future standards, e.g., H.266.

It should further be appreciated that the disclosed techniques are compatible with both live and on demand applications, and are applicable to video, audio, and other forms of media content.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
   (a) obtaining a plurality of video clips;
   (b) encoding each video clip in the plurality of video clips with a plurality of encoding profiles, each encoding profile including a unique set of values for a set of encoding parameters;
   (c) identifying a plurality of clip-optimized encoding profiles, wherein each clip-optimized encoding profile is selected based on a plurality of constraints and is associated with a respective one of the video clips;
   (d) initializing a plurality of clusters by designating, for each cluster, a respective one of the clip-optimized encoding profiles as a centroid encoding profile for that cluster; and
   (e) assigning each video clip of the plurality of video clips to a respective one of the initialized clusters by, for each video clip of the plurality of video clips:
      determining an area-under-the-curve associated with a first curve, and an area-under-the-curve associated with a plurality of additional curves that are different from the first curve, the areas-under-the-curve each comprising a metric of quality as a function of bitrate;
      measuring differences between the area-under-the-curve associated with the first curve and the area-under-the-curve associated with the plurality of additional curves, wherein the first curve is associated with encoding that video clip with its associated clip-optimized encoding profile and wherein each of the additional curves is associated with encoding that video clip with a respective one of the designated centroid encoding profiles; and
      assigning the video clip to the cluster whose designated centroid encoding profile was associated with the additional curve with the smallest measured difference in area-under-the-curve relative to the first curve.

2. The method of claim 1 further comprising:
   for each cluster, encoding any video clips assigned to that cluster with that cluster's designated centroid encoding profile; and distributing the encoded video clips to one or more client devices.

3. The method of claim 1 further comprising:
obtaining a plurality of additional video clips;
assigning each additional video clip to a respective one of the initialized clusters;
for each cluster, encoding any additional video clips assigned to that cluster with that cluster's designated centroid encoding profile; and
distributing the encoded additional video clips to one or more client devices.

4. The method of claim 1, wherein initializing the plurality of clusters comprises randomly or pseudo-randomly selecting a given number of clip-optimized encoding profiles as respective centroid encoding profiles for a corresponding given number of clusters.

5. The method of claim 1, wherein initializing the plurality of clusters comprises selecting a given number of clip-optimized encoding profiles as respective centroid encoding profiles for a corresponding given number of clusters according to a k-means++ algorithm.

6. The method of claim 1 further comprising:
(f) updating the designated centroid encoding profiles, by identifying, within each cluster of the plurality of clusters, a given clip-optimized encoding profile that is most similar, according to a similarity metric, to the other clip-optimized encoding profiles within that same cluster and updating the designated centroid encoding profile for that same cluster to the given clip-optimized encoding profile; and
(g) iterating (e) and (f) a plurality of times.

7. The method of claim 1, further comprising (f) updating, for each cluster, which of the clip-optimized encoding profiles associated with that cluster is the designated centroid encoding profile for that cluster by:
for each video clip assigned to that cluster, summing differences in area-under-the-curve in a bit rate-quality data space between a plurality of pairs of curves, wherein each pair of curves includes a first curve associated with encoding another video clip assigned to that cluster with the clip-optimized encoding profile associated with that other video clip and a second curve associated with encoding that other video clip with the clip-optimized encoding profile associated with that respective video clip; and
updating the designated centroid encoding profile for that cluster to the clip-optimized encoding profile associated with the video clip having the smallest sum of differences across its respective plurality of pairs of curves.

8. The method of claim 7 further comprising:
(g) iterating (e) and (f) a plurality of times.

9. A method, comprising:
(a) obtaining a plurality of clip-optimized encoding profiles, wherein each clip-optimized encoding profile is associated with a respective video clip out of a plurality of video clips;
(b) initializing a plurality of clusters by designating, for each cluster, a respective one of the clip-optimized encoding profiles as a centroid encoding profile for that cluster; and
(c) assigning each video clip of the plurality of video clips to a respective one of the initialized clusters based on a similarity metric that considers as inputs, when assigning a respective one of the video clips, the clip-optimized encoding profile associated with the video clip being assigned and the designated centroid encoding profiles of the plurality of clusters, wherein the assigning comprises determining the similarity metric by:
determining an area-under-the-curve associated with a first curve, and an area-under-the-curve associated with a plurality of additional curves, the area-under-the-curve comprising a metric of quality as a function of bitrate;
measuring differences between the area-under-the-curve associated with the first curve and the area-under-the-curve associated with the plurality of additional curves; and
assigning the video clip to the cluster whose designated centroid encoding profile was associated with the additional curve with the smallest measured difference in area-under-the-curve relative to the first curve.

10. The method of claim 9 wherein the first curve is associated with encoding that video clip with its associated clip-optimized encoding profile and wherein each of the additional curves is associated with encoding that video clip with a respective one of the designated centroid encoding profiles.

11. The method of claim 9 further comprising:
(d) updating the designated centroid encoding profiles, by identifying, within each cluster of the plurality of clusters, a given clip-optimized encoding profile that is most similar, based on an additional similarity metric, to the other clip-optimized encoding profiles within that cluster and updating the designated centroid encoding profile for that cluster to the given clip-optimized encoding profile.

12. The method of claim 9, wherein the clusters in the plurality of clusters comprise first clusters, the method further comprising:
(d) initializing a plurality of second clusters by designating, for each of the second clusters, a respective one of the clip-optimized encoding profiles as a centroid encoding profile for that second cluster; and
(c) assigning each video clip of the plurality of video clips to a respective one of the initialized second clusters based on the similarity metric, wherein there are fewer second clusters than first clusters, wherein the second clusters have designated centroid encoding profiles having a maximum bitrate equal to or below a given bitrate, and wherein the first clusters have designated centroid encoding profiles having a maximum bitrate greater than the given bitrate.

13. The method of claim 9, wherein initializing the plurality of clusters comprises randomly or pseudo-randomly selecting a given number of clip-optimized encoding profiles as respective centroid encoding profiles for a corresponding given number of clusters.

14. The method of claim 9, wherein initializing the plurality of clusters comprises selecting a given number of clip-optimized encoding profiles as respective centroid encoding profiles for a corresponding given number of clusters according to a k-mean++ algorithm.

15. A system, comprising:
one or more processors and memory configured to:
(a) obtain a plurality of clip-optimized encoding profiles, wherein each clip-optimized encoding profile is associated with a respective video clip out of a plurality of video clips;

(b) initialize a plurality of clusters by designating, for each cluster, a respective one of the clip-optimized encoding profiles as a centroid encoding profile for that cluster; and (c) assign each video clip of the plurality of video clips to a respective one of the initialized clusters based on a similarity metric that considers as inputs, when assigning a respective one of the video clips, the clip-optimized encoding profile associated with the video clip being assigned and the designated centroid encoding profiles of the plurality of clusters, wherein the assignment comprises determining the similarity metric by:

determination of an area-under-the-curve associated with a first curve, and an area-under-the-curve associated with a plurality of additional curves, the area-under-the-curve comprising a metric quality of as a function of bitrate;

measurement of differences between the areas-under-the-curve associated with the first curve and the area-under-the-curve associated with the plurality of additional curves; and assignment of the video clip to the cluster whose designated centroid encoding profile was associated with the additional curve with the smallest measured difference in area-under-the-curve relative to the first curve.

16. The system of claim 15 wherein the first curve is associated with encoding that video clip with its associated clip-optimized encoding profile and wherein each of the additional curves is associated with encoding that video clip with a respective one of the designated centroid encoding profiles.

17. The system of claim 15 wherein the processors and memory are further configured to:

(d) update the designated centroid encoding profiles, by identifying, within each cluster of the plurality of clusters, a given clip-optimized encoding profile that is most similar, based on an additional similarity metric, to the other clip-optimized encoding profiles within that cluster and updating the designated centroid encoding profile for that cluster to the given clip-optimized encoding profile.

18. The system of claim 17, wherein the processors and memory are further configured to repeat (c) and (d) at least one time.

19. The system of claim 17, wherein the processors and memory are further configured to update the designated centroid encoding profiles by, for each cluster:

for each clip-optimized encoding profile within that cluster, summing differences in area-under-the-curve in a bit rate-quality data space between a plurality of pairs of curves, wherein each pair of curves includes a first curve associated with using that clip-optimized encoding profile to encode a respective video clip of the plurality of video clips and a second curve associated with encoding the respective video clip with the clip-optimized encoding profile associated with that respective video clip; and updating the designated centroid encoding profile for that cluster to the clip-optimized encoding profile having the smallest sum of differences across its respective plurality of pairs of curves.

20. The system of claim 17, wherein the processors and memory are further configured to:

for each cluster, encode any video clips assigned to that cluster with that cluster's designated centroid encoding profile; and distribute the encoded video clips to one or more client devices.

\* \* \* \* \*